US012311404B2

(12) United States Patent
Lehnhoff et al.

(10) Patent No.: US 12,311,404 B2
(45) Date of Patent: May 27, 2025

(54) METHOD FOR PRODUCING AN ABRASION- AND WATER-RESISTANT MULTILAYER PANEL AND A PANEL WHICH IS PRODUCED USING SAID METHOD

(71) Applicant: Flooring Technologies Ltd., Kalkara (MT)

(72) Inventors: Ingo Lehnhoff, Dierhagen (DE); Norbert Kalwa, Horn-Bad Meinberg (DE); Frank Oldorff, Schwerin (DE)

(73) Assignee: Flooring Technologies Ltd., Kalkara (MT)

( * ) Notice: Subject to any disclaimer, the term of this patent is extended or adjusted under 35 U.S.C. 154(b) by 793 days.

(21) Appl. No.: 17/425,103

(22) PCT Filed: Jan. 9, 2020

(86) PCT No.: PCT/EP2020/050436
§ 371 (c)(1),
(2) Date: Jul. 22, 2021

(87) PCT Pub. No.: WO2020/151956
PCT Pub. Date: Jul. 30, 2020

(65) Prior Publication Data
US 2022/0105539 A1 Apr. 7, 2022

(30) Foreign Application Priority Data
Jan. 23, 2019 (EP) .................................... 19153171

(51) Int. Cl.
*B05D 1/36* (2006.01)
*B05D 1/28* (2006.01)
(Continued)

(52) U.S. Cl.
CPC ................ *B05D 1/36* (2013.01); *B05D 1/28* (2013.01); *B05D 3/12* (2013.01); *B05D 5/00* (2013.01);
(Continued)

(58) Field of Classification Search
None
See application file for complete search history.

(56) References Cited

U.S. PATENT DOCUMENTS 3,705,830 A 12/1972 Gurgui et al.
4,940,503 A 7/1990 Lindgren et al.
(Continued)

FOREIGN PATENT DOCUMENTS

CA 2283835 A1 8/1999
CH 648979 A3 4/1985
(Continued)

OTHER PUBLICATIONS

Yin, "Technology for the Manufacture of Wood Flooring", 2011, pp. 172-180, Issue 1, See Statement of Relevance attached herewith.
(Continued)

*Primary Examiner* — Michael N Orlando
*Assistant Examiner* — Abhishek A Patwardhan
(74) *Attorney, Agent, or Firm* — The Webb Law Firm

(57) ABSTRACT

It is provided a method for producing an abrasion- and water-resistant multilayer panel, in particular an abrasion- and water-resistant flooring panel, including the steps: providing at least one plastic carrier plate, in particular a PVC
(Continued)

carrier plate; applying at least one base coat to the surface of the plastic carrier plate; printing the plastic carrier plate by direct printing to form a decorative layer; applying at least one first cover layer to the printed decorative layer; uniformly scattering abrasion-resistant particles onto the at least one cover layer applied to the decorative layer; applying at least one second covering layer to the layer of scattered abrasion-resistant particles; optionally, introducing a structure into the at least second cover layer, applying at least one lacquer layer, and curing the layer structure.

12 Claims, 1 Drawing Sheet

(51) Int. Cl.
*B05D 3/12* (2006.01)
*B05D 5/00* (2006.01)
*B05D 7/00* (2006.01)

(52) U.S. Cl.
CPC ............... *B05D 7/51* (2013.01); *B05D 7/572* (2013.01); *B05D 2201/02* (2013.01); *B05D 2252/04* (2013.01); *B05D 2350/38* (2013.01); *B05D 2503/00* (2013.01); *B05D 2601/20* (2013.01)

(56) References Cited

U.S. PATENT DOCUMENTS

| | | | |
|---|---|---|---|
| 6,465,046 | B1 | 10/2002 | Hansson et al. |
| 6,555,216 | B2 | 4/2003 | Chen et al. |
| 8,173,240 | B2 | 5/2012 | Dohring |
| 8,512,804 | B2 | 8/2013 | Oldorff |
| 8,632,875 | B2 | 1/2014 | Oldorff |
| 8,955,281 | B2 | 2/2015 | Pietruczynik et al. |
| 8,969,219 | B2 | 3/2015 | Gvishi |
| 8,993,049 | B2 | 3/2015 | Pervan |
| 9,321,299 | B2 * | 4/2016 | Hansson ............... B44C 5/0469 |
| 9,365,028 | B2 | 6/2016 | Vogel |
| 9,434,206 | B2 | 9/2016 | Hoff |
| 9,757,974 | B2 | 9/2017 | Kalwa |
| 9,994,010 | B2 | 6/2018 | Pervan |
| 10,094,123 | B2 | 10/2018 | Meersseman et al. |
| 10,406,558 | B2 | 9/2019 | Dohring et al. |
| 11,192,398 | B2 | 12/2021 | Kalwa et al. |
| 2001/0049022 | A1 | 12/2001 | Takeuchi et al. |
| 2004/0086678 | A1 * | 5/2004 | Chen ..................... B44C 5/0461 428/44 |
| 2006/0240247 | A1 | 10/2006 | Haller |
| 2008/0000182 | A1 | 1/2008 | Pervan |
| 2009/0082485 | A1 | 3/2009 | Slark et al. |
| 2010/0080896 | A1 | 4/2010 | Bachmann |
| 2010/0098963 | A1 | 4/2010 | Dohring et al. |
| 2010/0221493 | A1 | 9/2010 | Hintze |
| 2011/0117340 | A1 | 5/2011 | Oldorff |
| 2011/0167744 | A1 | 7/2011 | Whispell et al. |
| 2011/0217463 | A1 | 9/2011 | Oldorff |
| 2012/0015176 | A1 | 1/2012 | Riebel et al. |
| 2014/0017452 | A1 | 1/2014 | Pervan et al. |
| 2014/0044958 | A1 | 2/2014 | Steinmann et al. |
| 2014/0255670 | A1 | 9/2014 | Kalwa |
| 2014/0290171 | A1 | 10/2014 | Vermeulen |
| 2015/0030817 | A1 | 1/2015 | Wiegelmann et al. |
| 2015/0064421 | A1 | 3/2015 | Dohring |
| 2015/0097907 | A1 | 4/2015 | Kalwa et al. |
| 2015/0197942 | A1 | 7/2015 | Pervan et al. |
| 2016/0016390 | A1 | 1/2016 | Lundblad et al. |
| 2017/0096776 | A1 | 4/2017 | Kalwa |
| 2017/0217121 | A1 | 8/2017 | Maier et al. |
| 2017/0314273 | A1 * | 11/2017 | Hugi ..................... E04F 15/107 |
| 2017/0370111 | A1 | 12/2017 | Troendle et al. |
| 2018/0002939 | A1 | 1/2018 | Harve et al. |
| 2018/0080867 | A1 | 3/2018 | Denk et al. |
| 2018/0320388 | A1 * | 11/2018 | Lombaert ............. B32B 27/308 |
| 2018/0339504 | A1 | 11/2018 | Ziegler et al. |
| 2018/0353992 | A1 | 12/2018 | Becker-Weimann et al. |
| 2019/0119930 | A1 * | 4/2019 | Blake ...................... B32B 37/12 |
| 2019/0160859 | A1 | 5/2019 | Kalwa et al. |
| 2019/0211571 | A1 | 7/2019 | Van Vlassenrode et al. |
| 2020/0011071 | A1 | 1/2020 | Patki et al. |
| 2020/0199885 | A1 | 6/2020 | Patki et al. |
| 2020/0208414 | A1 * | 7/2020 | Yu ......................... E04F 15/107 |
| 2020/0376886 | A1 | 12/2020 | Denk et al. |
| 2022/0212229 | A1 | 7/2022 | Kalwa et al. |

FOREIGN PATENT DOCUMENTS

| | | | |
|---|---|---|---|
| CN | 1084786 | A | 4/1994 |
| CN | 101374655 | A | 2/2009 |
| CN | 101608417 | A | 12/2009 |
| CN | 101712166 | A | 5/2010 |
| CN | 102086616 | A | 6/2011 |
| CN | 102171057 | A | 8/2011 |
| CN | 102264802 | A | 11/2011 |
| CN | 102294722 | A | 12/2011 |
| CN | 102083636 | B | 6/2013 |
| CN | 103526910 | A | 1/2014 |
| CN | 103764404 | A | 4/2014 |
| CN | 104220272 | A | 12/2014 |
| CN | 104314272 | A | 1/2015 |
| CN | 104520080 | A | 4/2015 |
| CN | 104640643 | A | 5/2015 |
| CN | 104870203 | A | 8/2015 |
| CN | 204551953 | U | 8/2015 |
| CN | 105307869 | A | 2/2016 |
| CN | 107530734 | A | 1/2018 |
| CN | 207449270 | U | 6/2018 |
| CN | 108864590 | A | 11/2018 |
| CN | 109153283 | A | 1/2019 |
| CN | 113874128 | A | 12/2021 |
| DE | 102004031547 | A1 | 3/2005 |
| DE | 102004032058 | A1 | 5/2005 |
| DE | 102008046749 | A1 | 3/2010 |
| DE | 102010036454 | A1 | 1/2012 |
| DE | 10117807 | B4 | 7/2012 |
| DE | 202011110956 | U1 | 10/2017 |
| EP | 0329154 | B1 | 11/1993 |
| EP | 1084317 | B1 | 3/2001 |
| EP | 1820640 | B1 | 8/2007 |
| EP | 2314381 | A1 | 4/2011 |
| EP | 2189282 | B1 | 5/2011 |
| EP | 2463116 | B1 | 11/2013 |
| EP | 2700508 | A1 | 2/2014 |
| EP | 2774770 | B1 | 4/2015 |
| EP | 2977219 | A1 | 1/2016 |
| EP | 3246175 | A1 | 11/2017 |
| EP | 3338993 | A1 | 6/2018 |
| EP | 3351402 | B1 | 4/2019 |
| EP | 3480030 | A1 | 5/2019 |
| JP | H11156818 | A | 6/1999 |
| JP | 20153400 | A | 1/2015 |
| JP | 2017503688 | A | 2/2017 |
| JP | 2017113696 | A | 6/2017 |
| NL | 6900898 | A | 7/1969 |
| RU | 2015886 | C1 | 7/1994 |
| RU | 2419495 | C2 | 5/2011 |
| WO | 9317182 | A1 | 9/1993 |
| WO | 0148333 | A1 | 7/2001 |
| WO | 2006002917 | A2 | 1/2006 |
| WO | 2007042258 | A1 | 4/2007 |
| WO | 2010112125 | A1 | 10/2010 |
| WO | 2011045690 | A2 | 4/2011 |
| WO | 2011076305 | A1 | 6/2011 |
| WO | 2014029887 | A1 | 2/2014 |
| WO | 2015152802 | A1 | 10/2015 |
| WO | 2016082066 | A1 | 6/2016 |
| WO | 2016114710 | A1 | 7/2016 |
| WO | 2017198474 | A1 | 11/2017 |
| WO | 2018034614 | A1 | 2/2018 |

(56) References Cited

FOREIGN PATENT DOCUMENTS

| | | | |
|---|---|---|---|
| WO | 2018067641 | A1 | 4/2018 |
| WO | 2018198034 | A1 | 11/2018 |
| WO | 2018217158 | A1 | 11/2018 |

OTHER PUBLICATIONS

Merline et al., "Melamine formaldehyde: curing studies and reaction mechanism", Polymer Journal, 2013, pp. 413-419, vol. 45.
"Particle Board vs Oriented Strand Board: How Are They Different?", 2015, pp. 1-3. Retrieved from https://www.web.archive.org/web/20150826012716/https://www.builddirect.com/learning-center/building-materials/particleboard-oriented-strand/.
Xu et al., "The effect of fillers on the wear resistance of thermoplastic polymeric coatings", Wear, 2001, pp. 1522-1531, vol. 251.
Baugh et al., "Diving Deep Into the Invasion of LVT and The Impact on the Flooring Industry", Building Products Industry Update, Sep. 4, 2018, pp. 1-31.
"Grundierung", Wikipedia, Oct. 27, 2018, pp. 1-2.
Thompson et al. "Fatigue in wood-based panels. Part 1: The strength variability and fatigue performance of OSB, chipboard and MDF", Wood Science and Technology, 2002, pp. 255-269, vol. 36.
Zhai, L., "Portable manual for applying decorative materials", Beijing Hope Electronic Press, Aug. 2018, pp. 160-161. (English-Language Translation).
Zhu et al., "Furniture Surface Coating", Northeast Forestry Univ. Press, Aug. 2016, pp. 83-84. (English-Language Translation).

* cited by examiner

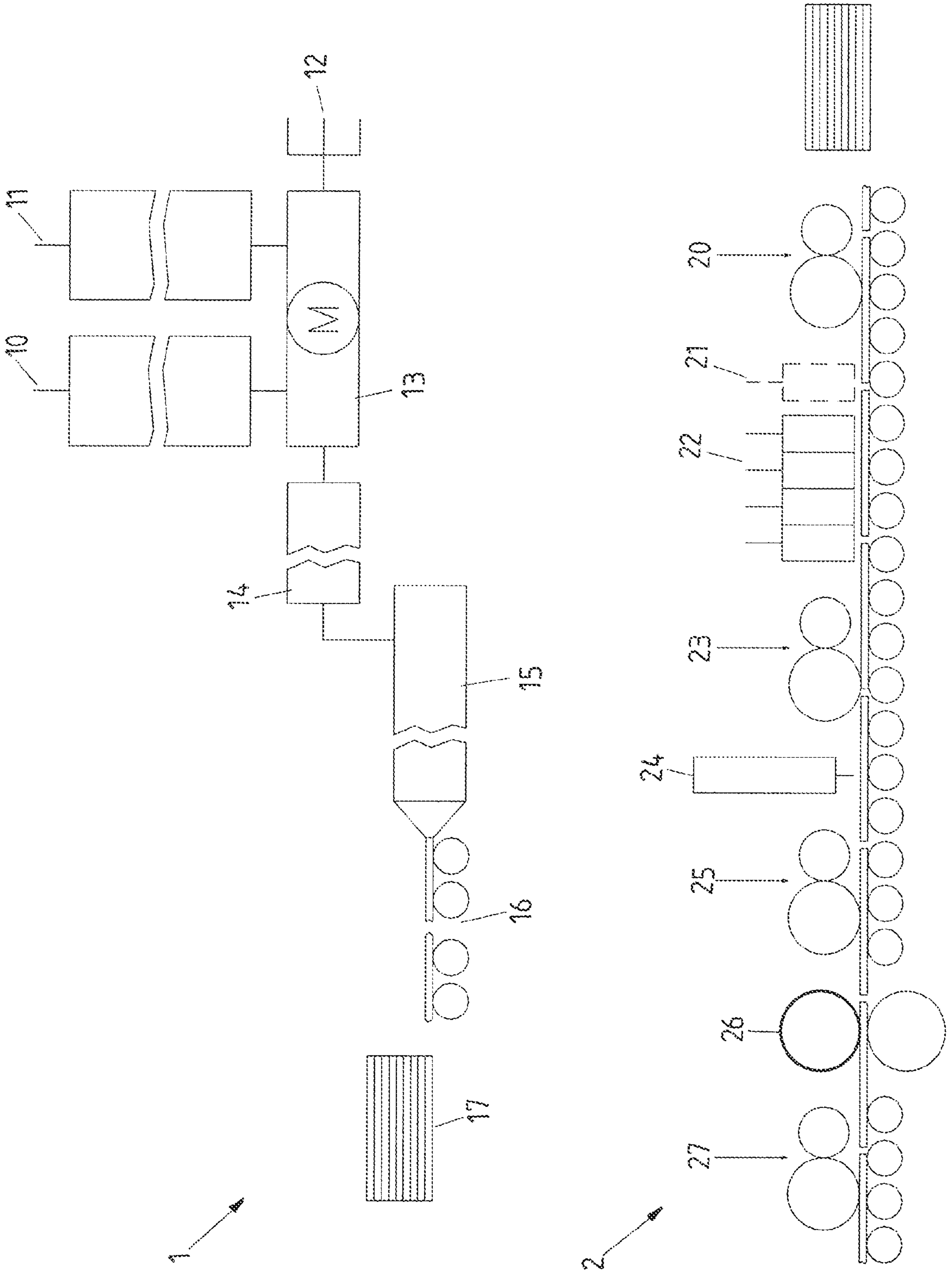
10
11
12
M
13
14
15
16
17
1
20
21
22
23
24
25
26
27
2

METHOD FOR PRODUCING AN ABRASION- AND WATER-RESISTANT MULTILAYER PANEL AND A PANEL WHICH IS PRODUCED USING SAID METHOD

CROSS-REFERENCE TO RELATED APPLICATIONS

This application is the United States national phase of International Application No. PCT/EP2020/050436 filed Jan. 9, 2020, and claims priority to European Patent Application No. 19153171.4 filed Jan. 23, 2019, the disclosures of which are hereby incorporated by reference in their entirety.

BACKGROUND OF THE INVENTION

Field of the Invention

The disclosure relates to a method for manufacturing an abrasion-resistant and waterproof multilayer panel, a panel produced by this method and a production line for carrying out this method.

Description of Related Art

Currently, the main floor coverings used are ceramic tiles, wood coverings (such as parquet floors), laminate, PVC coverings, but also textile floor coverings (such as carpets). Flooring made of PVC is often preferred in public and commercial places, but also in the home due to its resistant properties, ease of installation and low cost.

Floor coverings based on PVC are divided into several categories and subcategories. In particular, a distinction is made between traditional PVC flooring and the so-called LVT (Luxury Vinyl Tile) flooring.

Traditional PVC flooring essentially uses PVC as a base material with plasticizers, resulting in a flexible product that can be easily printed and placed on a floor. Traditional PVC products are among the most cost-effective floor coverings currently available.

The LVT products include, among others, PVC coverings and multilayer floor coverings, which have a hard core and are in turn divided into two classes. These include, on the one hand, WPC products (WPC=wood plastic composites or waterproof plastic composites), which originally comprise a layer of a wood-plastic mixture as the core layer. In addition to the use of wood to reduce costs, foaming the substrate can also be an alternative.

On the other hand, multi-layer PVC flooring includes SPC flooring, the core layer of which consists of a plastic component (usually PVC) and a larger proportion of minerals. Due to the greater proportion of minerals, the stiffness, weight and density is higher.

The production of SPC floor coverings (SPC=stone plastic composite) has been growing strongly in terms of volume in recent years. In the simplest case, the product consists of a carrier, a decorative layer and a wear layer.

The carrier consists of a highly filled thermoplastic, such as polyvinyl chloride or polypropylene, with chalk or talc usually used as fillers. The decorative layer is usually a printed thermoplastic film, which also has PVC or PP as its material base. In the simplest case, the wear layer is a transparent, thermoplastic film (PVC or PP).

During production, the carrier is first produced in an extruder, and directly afterwards the decorative and wear films are calendered on. The surface structure of the product is created by the structuring of the calender. The higher the desired wear class is to be, the thicker the wear film must be. This not only leads to cost disadvantages, but also to transparency problems with the higher wear classes.

To solve these problems, US 2018/0339504 A1 or WO 2018/217158 A1, for example, describe the application of a duplicated film to a substrate, with abrasion-resistant particles intercalated between the two films. The production of the doubled film with the embedded abrasion-resistant particles is carried out in a separate production line, and the doubled abrasion-resistant film is typically stored temporarily before further processing. The doubled film is then pressed or calendered onto a substrate (e.g. a PVC substrate). Here, too, the use of two films as a wear layer does not achieve a cost-optimal result.

The approaches known so far for the production of abrasion- and water-resistant panels lead to products with poor transparency and, due to the complex manufacturing process, to higher costs.

SUMMARY OF THE INVENTION

The proposed solution is therefore based on the technical problem of providing a process for producing an SPC floor covering in which the surface of the plastic carrier plate is produced and finished more efficiently. At the same time, the technical properties should not deteriorate and no other product deteriorations should occur. The productivity of the production line is also not to be impaired by the process.

The object is solved by a method having features as described herein, a panel having features as described herein, and a production line having features as described herein.

Accordingly, there is provided a method of manufacturing an abrasion- and water-resistant multilayer panel, in particular an abrasion- and water-resistant floor panel, comprising the following steps:

- Providing at least one plastic carrier plate, in particular a PVC carrier plate;
- Applying at least one base coat comprising at least one hot melt adhesive to the surface of the plastic carrier plate;
- Direct printing of the plastic carrier plate with the formation of a decorative layer;
- Applying at least one first cover layer comprising at least one hot melt adhesive to the imprinted decorative layer;
- uniform scattering of abrasion-resistant particles onto the at least one cover layer applied to the decorative layer;
- Applying at least a second cover layer comprising at least one hot melt adhesive to the layer of scattered abrasion resistant particles;
- optionally, introducing a structure into the at least second cover layer;
- Applying at least one lacquer layer; and
- Curing of the layer structure.

The production of the plastic carrier plate can precede the above method. The plastic carrier plate is first prepared as a continuous strand and then cut to size if necessary.

The plastic carrier plate (or SPC core) can be made of various thermoplastics, such as polyvinyl chloride (PVC) or polypropylene (PP), with PVC being the preferred plastic.

In one embodiment of the present method, the plastic carrier plate is first produced as a continuous strand by extrusion of a mixture containing PVC, limestone and optional auxiliaries.

The mixture to be extruded can be provided in various alternatives. In one variant, the mixture to be extruded can be provided in the form of a powder, with the various ingredients being mixed in a mixing device to form a powdery mixture, which is introduced into the extrusion device after optional intermediate storage.

In another variant, the mixture is provided in the form of a compound. The compound consists of the individual components which have already been melted together once and are then comminuted to form processable particles (e.g. pellets) which are fed into the extruder device. Accordingly, a mixing device, intermediate hopper and melting device can be dispensed with when using a compound, In one embodiment, the mixture to be extruded comprises 20-40 wt % PVC, preferably 25-35 wt % PVC, 60-80 wt % limestone, preferably 65-75 wt % limestone, and optionally other auxiliary materials. In a preferred embodiment, the mixture to be extruded comprises 65 wt % limestone (chalk) and 35 wt % PVC.

When starting from powdered raw materials, the particle size of the limestone should be similar to the particle size of the PVC powder. This facilitates the production of the powder mixture and avoids segregation or inhomogeneities. Of course, this also applies to the production of the compound.

Stabilizers, waxes, lubricants, release agents and other auxiliaries can be added as additives. A preferred stabilizer comprises Ca—Zn and can be added in an amount between 1 and 3 wt %, preferably 2 wt % of the compound to be extruded. PE waxes can be used as waxes. Preferred release agents are CPE release agents, which are used in an amount between, 0.5 and 1.5 wt %, preferably 1 wt % in the mixture to be extruded.

The abbreviation CPE stands for chlorinated polyethylene, a copolymer of ethylene and vinyl chloride. Depending on the ratio of the two monomers, the chlorine content in the polymer can vary, unlike in PVC. CPE is used, among other things, as an agent to increase impact strength.

The extrusion of the mixture is carried out in an extruder with discharge of a sheet-like strand. As mentioned above, the mixture of PVC, $CaCO_3$ or limestone and other additives to be extruded is either prepared in advance by mixing the powdered ingredients, melting the PVC and cooling, or as a finished compound.

The mixture to be extruded then passes through a multistage extruder with zones of different temperature, with partial cooling with water. The mixture to be extruded is elastified in the extruder under the influence of temperature and shear force to form a “kneadable” mass. A sheet-like strand (e.g. with a maximum width of 1,400 mm) is discharged from the extruder via a slot die onto a roller conveyor.

In the further method, the endless strand can be fed as such into the further processing plant for surface finishing in one variant. In another possible variant, the continuous strand can be cut to length. In this case, the continuous strand is cut into separate half-formats and the half-formats are fed to further processing as a plastic carrier plate. It is also possible to feed the half-formats as a quasi-plate strand, i.e. edge to edge, into the further processing plant.

The plastic carrier plate is surface finished as follows:

As stated above, in a next step, at least one base coat is applied to the plastic carrier plate made of a hot-melt adhesive before printing on the same Hotmelt adhesives are typically solvent-free and usually solid products at room temperature, which are applied to an adhesive surface in a molten state and cause the formation of a solid bond upon cooling. Accordingly, the bonding properties are brought about by solidification due to cooling and not by curing associated with a chemical crosslinking reaction. Typical applications include edge coating, surface bonding, as a pressure-sensitive hotmelt adhesive on envelopes or use as a wrapping adhesive. The use of hotmelt adhesives as surface coatings for plastic carrier plates, on the other hand, is not yet known.

In one embodiment of the present method, the at least one hotmelt adhesive is selected from a group comprising polyurethane, e.g. thermoplastic polyurethanes, polyamide, ethylene vinyl acetate, polyester or polyolefin. The material is selected with regard to the intended area of application and the resulting stresses in terms of temperature, chemicals, water, etc. If EVA, polyamide or polyolefin are used, the resin layers are preferably consolidated by cooling. Polyurethane and polyolefin are preferred because of their higher heat resistance (>100° C.). The use of polyurethane as a hotmelt adhesive has the further advantage that post-crosslinking with the surface of the plastic carrier plate is achieved, resulting in particularly good adhesion to the surface of the plastic carrier plate.

In one embodiment, the surface of the plastic carrier plate can be pretreated before printing to improve the adhesion of the subsequent layers.

This can be a cleaning with brushes, a grinding, which also frees the surface from unevenness. Treatment of the surface to increase the surface tension, e.g. by means of a plasma or corona treatment, is not necessary when using hotmelt adhesives for priming. Thus, hotmelt adhesives have comparable surface tension values to plastic carrier plates. A PVC plastic carrier, such as that used in the present method, has a surface tension value of approximately 40 mN/m. A PU hotmelt adhesive has a surface tension value of 43-47 mN/m. This means that a PVC surface can be coated with a PU hotmelt without pretreatment (e.g.: corona, flame treatment, plasma, primer or similar).

If UV lacquers containing acrylics are used for priming, a surface tension of the substrate of 48-56 mN/m is required. This means that a PVC substrate cannot be finished with UV technology without pretreatment to increase the surface tension. Accordingly, the use of UV lacquers for surface coating requires pretreatment of the surface of the plastic carrier plate and thus an additional method step. In addition, the use of UV lacquers requires a crosslinking reaction for curing, which is typically brought about by UV irradiation. This means that in a coating method using UV lacquers, additional method steps are required for application and curing by means of UV irradiation. These additional method steps are avoided when hot coatings (or hot melt adhesives) are used, since the hot melt adhesives can be applied to an untreated plastic carrier plate and already cure by simply cooling. The entire manufacturing method is thus simplified and more cost-effective.

In one variant, it is also possible to additionally use a primer as base coat. In this case, the amount of liquid primer applied is presently between 1 and 30 g/m$^2$, preferably between 5 and 20 g/m$^2$, in particular preferably between 10 and 15 g/m$^2$. Polyurethane-based compounds are preferably used as primers.

The hotmelt adhesive and, if necessary, the base coat can contain inorganic color pigments and thus serve as a white base layer for the decorative layer to be subsequently printed on. White pigments such as titanium dioxide $TiO_2$ can be used as color pigments. Other color pigments can be calcium carbonate, barium sulfate or barium carbonate.

It is also conceivable that the base coat consists of at least one, preferably at least two or more successively applied layers or coatings, the application quantity between the layers or coatings being the same or different, i.e. the application quantity of each individual layer may vary.

The base coat can be applied to the surface of the plastic carrier plate using a roller.

In a preferred embodiment, a white ground is applied to the base coat by means of digital printing on the plastic carrier plate. The digital printing inks used for digitally printing the white background are preferably based on UV inks enriched with white color pigments. However, it is also possible to use water-based digital printing inks or so-called hybrid inks. Application by means of digital printing is advantageous because the printing equipment is significantly shorter than a rolling device, thus saving space, energy and costs.

In a particularly preferred embodiment, the at least one decoration is applied to the (surface-treated and precoated) carrier board by means of a digital printing method. In digital printing, the printed image is transferred directly from a computer to a printing press, such as a laser printer or inkjet printer. This eliminates the use of a static printing plate. Decor printing is based on the inkjet principle in a single-pass method in which the entire width of the top side to be printed is spanned, with the plates moving under the printer. However, it is also possible for the carrier plate to be printed to be stopped under the printer, which then passes over the surface at least once during printing.

The printing inks are grouped together in separate printhead rows, and one or two rows of printheads can be provided for each color. The colors of the digital printing inks are, for example, black, blue, red, reddish yellow, greenish yellow, optionally CMYK can also be used. The digital printing inks are optionally based on the same pigments used for analog and/or digital printing with water-based inks. The digital printing inks are preferably based on UV inks. However, it is also possible to use water-based digital printing inks or so-called hybrid inks. After printing, drying and/or irradiation of the decorative print takes place.

The printing inks are applied in a quantity of between 1 and 30 g/m$^2$, preferably between 3 and 20 g/m$^2$, in particular preferably between 3 and 10 g/m$^2$.

As mentioned above, a first cover layer is applied to the decorative layer. This first cover layer is applied to the decorative layer as a liquid application and consists of a hotcoating or hotmelt adhesive layer. The use of a first cover layer is advantageous because improved adhesion of the subsequently spread particles and the subsequently applied layers is achieved.

A polyurethane hotmelt (or polyurethane hotmelt adhesive) is preferably used as the hotcoating or hotmelt (hotmelt adhesive) cover. The PUR hotmelt is applied at an application temperature of approx. 150° C. The use of polyurethane as a hotmelt has the further advantage that post-crosslinking with the surface of the plastic carrier plate takes place, resulting in particularly good adhesion to the surface.

The application rate of the hotcoat as the first cover layer is between 20 and 50 g/m$^2$, preferably 30 and 40 g/m$^2$.

As mentioned above, abrasion-resistant particles are scattered onto the at least one first cover layer applied to the decorative layer. The advantage of scattering the abrasion-resistant particles is that the quantity and distribution can be adjusted specifically and quickly, and a rapid changeover to different product requirements is possible.

In a further embodiment of the present method, abrasion resistant particles, particles of corundum (aluminum oxides), boron carbides, silicon dioxides, silicon carbides are used. Particles of corundum are particularly preferred. Preferably, these are high-grade (white) corundum with a high transparency, so that the optical effect of the underlying decor is adversely affected as little as possible. Corundum has an irregular spatial shape.

The amount of scattered abrasion-resistant particles is 10 to 50 g/m$^2$, preferably 10 to 30 g/m$^2$, in particular preferably 15 to 25 g/m$^2$. The amount of scattered abrasion-resistant particles depends on the abrasion class to be achieved and the particle size. Thus, in the case of abrasion class AC3, the amount of abrasion-resistant particles is in the range between 10 to 15 g/m$^2$, in abrasion class AC4 between 15 to 20 g/m$^2$, and in abrasion class AC5 between 20 to 25 g/m$^2$ when using grit size F220. In the present case, the finished boards preferably exhibit abrasion class AC4. Whereby the test is carried out according to DIN EN 16511—May 2014 procedure A or B "Panels for floating installation—Semi-rigid, multi-layer modular flooring (MMF) with abrasion resistant top layer".

Abrasion resistant particles with grain sizes in classes F180 to F240 are used. The grain size of class F180 covers a range of 53-90 μm, F220 from 45-75 μm, F230 34-82 μm, F240 28-70 μm (FEPA standard). In a particularly preferred embodiment, corundum particles of class F220 are used.

The abrasion-resistant particles must not be too fine-grained (risk of dust formation), but also not too coarse-grained. The size of the abrasion-resistant particles is thus a compromise.

In a more advanced embodiment, silanized corundum particles may be used. Typical silanization agents are aminosilanes. Silanization of the corundum particles enables improved adhesion ("docking") of the corundum particles to the layers presented.

As mentioned above, at least one second cover layer of a hot melt adhesive is applied to the layer of scattered abrasion-resistant particles. Preferably, the at least one second covering layer also consists of a PU hot melt. This second cover layer serves a) to cover the decoration, b) as a structural support, and c) together with the scattered corundum, provides wear resistance against abrasion.

The amount of hotcoating applied to the layer of scattered abrasion-resistant particles varies depending in particular on the amount of the first cover layer applied to the print decoration. The amount of hotcoating applied as a second cover layer is in a range between 20-50 g/m$^2$, preferably 30-40 g/m$^2$.

As mentioned above, the next step is to structure the second cover layer. The structuring is usually realized by a structured roller. However, it is also possible to use a structuring agent (e.g. structuring film, structuring paper) as an alternative or in addition.

It is also possible for the structure in the register to run parallel to the decor, so-called EIR structure or decor-synchronous structure. For this purpose, position and speed are synchronized between the carrier plate to be structured and the structure generator (roller and/or structure generator paper).

The at least one lacquer layer is then applied to the at least one second, now structured cover layer, wherein the at least one lacquer layer consists of a top lacquer with nanoparticles, e.g. nanoparticles of silica.

The at least one lacquer layer serves to improve the scratch resistance and, if necessary, to adjust the gloss level. The lacquer layer consists of a topcoat with nanoparticles, e.g. of silica. The lacquer, preferably a PU lacquer, can be applied in an amount of between 40 and 60 g/m$^2$, preferably 50 g/m$^2$, by means of further rollers.

Radiation-curable acrylate-containing lacquers are used in particular for the topcoat. Typically, the radiation-curable lacquers used contain (meth)acrylates, such as polyester (meth)acrylates, polyether (meth)acrylates, epoxy (meth) acrylates or urethane (meth)acrylates. It is also conceivable that the acrylate or acrylate-containing varnish used is substituted or unsubstituted monomers, oligomers and/or polymers, in particular in the form of acrylic acid, acrylic ether and/or acrylic acid ester monomers, oligomers or polymers. Of importance for the present method is the presence, as defined, of a double bond or unsaturated group in the acrylate molecule. The polyacrylates may also be further functionalized. Suitable functional groups include hydroxy, amino, epoxy and/or carboxyl groups. The aforementioned acrylates allow crosslinking or curing in the presence of UV or electron beams (ESH).

It is also possible to carry out the above-mentioned structuring (e.g. by means of a structurer or a structured roller) only in the top lacquer; i.e. the structuring is carried out only after application of the final top lacquer. It is also conceivable that, in the case of an acrylate lacquer as top lacquer, curing of the layer structure is already carried out together with the structuring agent, so that curing takes place largely in the absence of oxygen (i.e. inert), whereby high gloss levels can be achieved.

The layer build-up is finally dried and cured.

Radiation curing is thus preferably carried out by exposure to high-energy radiation such as UV radiation or by irradiation with high-energy electrons. Preferred radiation sources are lasers, high-pressure mercury vapor lamps, flashlights, halogen lamps or excimer emitters. The radiation dose usually sufficient for curing or crosslinking is in the range of 80-3000 mJ/cm$^2$ for UV curing. If necessary, irradiation can also be carried out in the absence of oxygen, i.e. in an inert gas atmosphere. In the presence of oxygen, ozone is formed, making the surface dull. Suitable inert gases include nitrogen, noble gases or carbon dioxide. The present method is preferably carried out under a nitrogen atmosphere.

The surface-finished panel format can be profiled longitudinally and transversely on automatic milling machines, but separately, so that the milling waste can be recycled.

In a further embodiment of the present method, a lockable tongue-and-groove joint is introduced at at least two opposite edges of the panel. This enables simple and fast floating installation of the panels. Such tongue-and-groove joints are known from EP 1 084 317 B1, among others.

The present method thus enables the production of an abrasion-resistant and waterproof multilayer panel having the following structure (from bottom to top):

- at least one plastic carrier plate, in particular a PVC carrier plate;
- at least one base coat comprising at least one hot melt adhesive;
- at least one decorative layer printed by direct printing,
- at least one first cover layer provided on the decorative layer comprising at least one hot melt adhesive;
- at least one layer of abrasion resistant particles on the at least one first cover layer;
- at least one second, preferably structured, cover layer provided on the layer of abrasion-resistant particles, comprising at least one hot-melt adhesive, and
- at least one lacquer layer provided on the second cover layer.

The abrasion-resistant and waterproof panels have a bulk density between 1500 and 3000 kg/m$^3$, preferably 2000 and 2500 kg/m$^3$. The total thickness of the panels is less than 6 mm, between 3 and 5 mm, preferably 3 and 4.5 mm.

In one embodiment, a white ground is provided between the base coat and the printed decorative layer.

The layered structure would be in this embodiment (seen from bottom to top):

- at least one plastic carrier plate,
- at least one base coat comprising at least one hot melt adhesive,
- at least one white ground;
- at least one decorative layer printed directly onto the base coat,
- at least one first cover layer provided on the decorative layer comprising at least one hot melt adhesive;
- at least one layer of abrasion resistant particles on the at least one first cover layer;
- at least one second, optionally structured cover layer provided on the layer of abrasion-resistant particles, comprising at least one hotmelt adhesive, and
- at least one lacquer layer provided on the second cover layer.

In another preferred embodiment, the present panel has the following layered structure (viewed from bottom to top):

- at least one PVC carrier plate;
- at least one hot melt adhesive as a base coat,
- at least one white ground;
- at least one decorative layer printed directly onto the base coat,
- at least one hot melt adhesive provided on the decorative layer as a first cover layer;
- at least one layer of abrasion-resistant particles on the hotmelt adhesive as the first cover layer;
- at least one second, optionally structured hotmelt adhesive provided on the layer of abrasion-resistant particles as a second cover layer, and
- at least one lacquer layer provided on the hotmelt adhesive as a second cover layer.

As mentioned above, the present panel may also have a structuring in the paint layer closing the overall structure (reference is made to the above explanations in this respect).

The production line for carrying out the present method includes the following elements:

- at least one applicator for applying at least one base coat comprising at least one hot melt adhesive to the at least one plastic carrier plate;
- at least one printer for applying at least one decorative layer;
- at least one device provided downstream of the printer in the processing direction for applying at least one first cover layer comprising at least one hot-melt adhesive to the decorative layer;
- at least one device for scattering a predetermined amount of abrasion resistant particles; and
- at least one device arranged downstream of the scattering device in the processing direction for applying at least one second covering layer comprising at least one hot-melt adhesive, and
- at least one device for applying a lacquer layer.

In one variant of the present production line, the manufacturing method for the plastic carrier plate can be upstream. This subsection comprises at least one mixing device for mixing the starting materials for the plastic carrier plate in the processing direction. In the mixing device, the thermoplastic material, in particular PVC, limestone and further additives are mixed together. In a more advanced variant, the section of the production line comprises at least one intermediate hopper arranged downstream of the mixing device in the processing direction for storing the mixture of plastic, limestone and further additives. An extruder is connected to the intermediate bunker in the processing direction. It is also possible to dispense with the mixing device and intermediate hopper. In this case, a finished compound is prepared from the starting materials (e.g. in the form of pellets) and fed into the extruder.

The compound (powder or compound) is elasticized in the extruder and pressed through a profile to form a continuous strand (SPC strand), which is cut to length (i.e. cut to a desired format) and the separated formats are stacked as carrier plates before further processing.

For surface treatment, the carrier plates are separated and first subjected to a pretreatment, such as grinding, which also frees the surface from unevenness. The devices required for this are known.

As mentioned above, a base coat consisting of a hotmelt adhesive (optionally enriched with white pigments) is applied to the plastic carrier plate after pretreatment, if necessary. The application device used for this purpose is preferably in the form of a roller unit.

A white ground can then be applied to the base coat using a digital printer.

In a preferred embodiment, a digital printer is also used to print the decorative layer.

The at least one device provided downstream of the printer in the processing direction for applying at least one first cover layer to the decorative layer is preferably in the form of a roller applicator or a spray unit.

The scattering device for the abrasion-resistant particles provided in the present production line is suitable for scattering powder, granules, fibers and comprises an oscillating brush system. The scattering device consists essentially of a supply hopper, a rotating, structured roller and a scraper. Here, the rotational speed of the roller is used to determine the amount of abrasion-resistant material applied. The scattering device preferably comprises a spiked roller.

In one embodiment of the present production line, it is further provided that the at least one scattering device is surrounded by or arranged in at least one booth, which is provided with at least one means for removing dusts occurring in the booth. The means for removing the dusts may be in the form of a suction device or may be in the form of a device for blowing in air. The blowing in of air can be achieved via nozzles installed at the plate inlet and outlet, which blow air into the booth. In addition, these can prevent air movements from creating an inhomogeneous scatter curtain of abrasion-resistant material.

The removal of dust from abrasion-resistant material from the environment of the scattering device is advantageous, because apart from the obvious health burden for the workers working on the production line, the fine dust from abrasion-resistant particles is also deposited on other equipment parts of the production line and leads to increased wear of the same. Therefore, the arrangement of the scattering device in a cabin serves not only to reduce the health impact of dust on the environment of the production line, but also prevents premature wear.

The scattering device is followed in the processing direction by the device for applying the at least one second cover layer, which is also in the form of a roller unit.

The final lacquer layer is also applied using a roller device.

A textured roller can be provided between the device for applying the elastic layer (hotcoating) and the roller device for applying the final lacquer layer and/or downstream of the latter.

The application devices are followed in the processing direction by devices for curing the layer structure, such as dryers and/or blasters.

BRIEF DESCRIPTION OF THE DRAWINGS

The solution is explained in more detail below with reference to the FIGURE in the drawings, using an example of an embodiment.

FIG. 1 shows a schematic representation of a production line of a multilayer panel according to one embodiment of the method according to the solution.

DESCRIPTION OF THE INVENTION

The production line shown schematically in FIG. 1 comprises a first section 1 for producing the plastic carrier plate and a second section 2 for surface processing the plastic carrier plate.

Subsection 1 initially comprises a storage container 10 for PVC powder and a storage container 11 for limestone, which are mixed together in the mixing device 13 with the addition of further auxiliary materials 12.

This powdered mixture of PVC, limestone (or chalk) and further additives can be temporarily stored in an intermediate hopper 14. The intermediate hopper 14 is arranged downstream of the mixing device in the processing direction. The extruder 15 is connected to the intermediate hopper 14 in the processing direction.

As already discussed, a compound made from the individual components in pellet form can also be used directly as the starting component for extruder 15. In this case, storage tanks 10, 11, 12, mixing device 13, and intermediate hopper 14 can be dispensed with.

The mixture (powder or compound) is fed into the extruder device 15 and pressed through a profile to form a continuous strand (SPC strand). The extruder device 15 is designed as a multi-stage extruder with zones of different temperature, with partial cooling with water. A sheet-like strand (e.g. with a maximum width of 1,400 mm) is discharged from the extruder via a slot die onto a roller conveyor 16, cut to size and stacked.

Subsection 2 for the surface treatment of the plastic carrier plate starts with a separation and pre-treatment of the carrier plates, such as grinding (not shown).

In a next step, at least one white-pigmented PUR hot melt is applied as a base coat to the surface of the plastic carrier plate using a roller unit 20.

In the embodiment shown in FIG. 1, this is followed by a digital printer 21 for applying a white background, followed by one or more digital printers 22 for printing the decorative layer. The decorative printing is carried out according to the inkjet principle in a single-pass process in which the entire width of the top side to be printed is covered, with the plates being moved under the printer.

The at least one device provided downstream of the printer 22 in the processing direction for applying a hot coating (PUR hot melt) as a first cover layer to the decorative layer is designed as a roller application device 23.

Downstream of the roller application device 23 for the first cover layer, a first scattering device 24 is provided for uniformly scattering the abrasion-resistant material, such as corundum, on the upper side of the plastic carrier plate. The abrasion-resistant material used is corundum F220, which measures about 45-75 μm in diameter according to FEPA standards.

The scattering device 24 essentially consists of a supply hopper, a rotating, structured spiked roller and a scraper. The application quantity of the material is determined by the rotational speed of the spreader roller. Depending on the required abrasion class of the product, between 12-25 $g/m^2$ of corundum is spread onto the board (AC4 (according to DIN EN 16511)=20 g/$m^2$). From the spiked roller, the corundum falls at a distance of 5 cm onto the panel provided with the decorative foil.

The scattering device 24 is followed in the processing direction by the device 25 for applying a hot coating as a second cover layer. Here, too, a PUR hotmelt is used as the hotcoating.

The final lacquer layer is also applied using a roller device 27.

A textured roller 26 is provided between the device 25 for applying the second cover layer and the roller device 27 for applying the final lacquer layer.

The application devices are followed in the processing direction by devices for curing the layer structure, such as dryers and/or radiators (not shown). Suitable cooling devices and cutting devices are provided for further finishing (not shown).

The invention claimed is:

1. A method of manufacturing an abrasion and water resistant multilayer panel comprising the steps of:

providing at least one polyvinyl chloride (PVC) carrier plate;

applying at least one base coat comprising at least one polyurethane hot melt adhesive to a surface of the PVC carrier plate;

applying at least one white base coat on top of the at least one base coat;

direct printing of the PVC carrier plate with a formation of a decorative layer;

applying at least one first cover layer comprising a polyurethane hot melt adhesive to the decorative layer, wherein the amount of the polyurethane hot melt adhesive of the at least one first cover layer is 20 and 50 g/$m^2$;

uniformly scattering a layer of abrasion-resistant particles onto the at least one first cover layer applied to the decorative layer;

applying at least one second cover layer comprising a polyurethane hot melt adhesive to the layer of scattered abrasion resistant particles, wherein the amount of the polyurethane hot melt adhesive of the at least one second cover layer varies depending on the amount of the polyurethane hot melt adhesive of the first cover layer and is 20 and 50 g/$m^2$;

introducing a structure into the at least one second cover layer;

applying at least one lacquer layer to the at least one second cover layer; and curing the layer structure, wherein the polyurethane hot melt adhesive is applied as the first cover layer and the second cover layer at an application temperature of around 150° C.

2. The method according to claim 1, wherein the surface of the PVC carrier plate is pretreated before printing to improve adhesion of subsequent layers.

3. The method according to claim 1, wherein the at least one base coat applied to the surface of the PVC carrier plate before printing comprises at least one primer layer.

4. The method according to claim 1, wherein the at least one white base coat is applied to the at least one base coat by digital printing.

5. The method according to claim 1, wherein the at least one decorative layer is applied by digital printing.

6. The method according to claim 1, wherein particles of corundum (aluminum oxides), boron carbides, silicon dioxides, silicon carbides are used as abrasion-resistant particles.

7. The method according to claim 1, wherein the at least one lacquer layer comprises a UV top lacquer.

8. The method according to claim 1, further comprising providing a lockable tongue-and-groove joint at at least two opposite edges of the panel.

9. The method according to claim 1, wherein the panel is an abrasion and water resistant floor panel.

10. The method according to claim 1, wherein the amount of the polyurethane hot melt adhesive of the first cover layer is 30 and 40 g/m2.

11. The method according to claim 1, wherein the amount of the polyurethane hot melt adhesive of the second cover layer is 30 and 40 g/m2.

12. The method according to claim 2, wherein the pretreatment is a grinding operation.

* * * * *